(12) United States Patent
Knüppel et al.

(10) Patent No.: US 9,528,499 B2
(45) Date of Patent: Dec. 27, 2016

(54) POWER OSCILLATION DAMPING CONTROLLER

(75) Inventors: Thyge Knüppel, Copenhagen N (DK); Sathees Kumar, Herning (DK); Patrik Thuring, Malmoe (SE)

(73) Assignee: SIEMENS AKTIENGESELLSCHAFT, München (DE)

( * ) Notice: Subject to any disclaimer, the term of this patent is extended or adjusted under 35 U.S.C. 154(b) by 488 days.

(21) Appl. No.: 13/825,345

(22) PCT Filed: Jun. 10, 2011

(86) PCT No.: PCT/EP2011/059704
§ 371 (c)(1),
(2), (4) Date: Mar. 21, 2013

(87) PCT Pub. No.: WO2012/041543
PCT Pub. Date: Apr. 5, 2012

(65) Prior Publication Data
US 2013/0175871 A1 Jul. 11, 2013

(30) Foreign Application Priority Data
Sep. 28, 2010 (EP) .................................. 10181108

(51) Int. Cl.
| | |
|---|---|
| *H02J 3/24* | (2006.01) |
| *F03D 9/00* | (2016.01) |
| *H02J 3/38* | (2006.01) |
| *H02P 9/02* | (2006.01) |

(52) U.S. Cl.
CPC ................. *F03D 9/005* (2013.01); *H02J 3/24* (2013.01); *H02J 3/386* (2013.01); *H02P 9/02* (2013.01); *Y02E 10/763* (2013.01)

(58) Field of Classification Search
CPC .......... H02J 3/386; Y02E 10/763; F03D 9/005
See application file for complete search history.

(56) References Cited

U.S. PATENT DOCUMENTS

| | | | |
|---|---|---|---|
| 3,465,235 A * | 9/1969 | Martin et al. | .................... 322/24 |
| 4,080,559 A | 3/1978 | Swann | |
| 4,435,647 A * | 3/1984 | Harner | .................. F03D 7/0224 290/44 |
| 4,454,428 A * | 6/1984 | Kimmel et al. | ............. 290/40 R |
| 5,793,821 A * | 8/1998 | Norrell et al. | ................. 375/355 |
| 7,205,931 B2 * | 4/2007 | Gila et al. | ..................... 342/127 |

(Continued)

FOREIGN PATENT DOCUMENTS

| | | |
|---|---|---|
| CN | 101335457 A | 12/2008 |
| CN | 201167238 Y | 12/2008 |

(Continued)

*Primary Examiner* — Thienvu Tran
*Assistant Examiner* — Pinping Sun

(57) ABSTRACT

A power oscillation damping controller is provided for a power generation device such as a wind turbine device. The power oscillation damping controller receives an oscillation indicating signal indicative of a power oscillation in an electricity network and provides an oscillation damping control signal in response to the oscillation indicating signal, by processing the oscillation damping control signal in a signal processing chain. The signal processing chain includes a filter configured for passing only signals within a predetermined frequency range.

8 Claims, 3 Drawing Sheets

(56) References Cited

U.S. PATENT DOCUMENTS

| | | | |
|---|---|---|---|
| 7,839,024 B2* | 11/2010 | Cardinal et al. | 307/84 |
| 7,890,293 B2* | 2/2011 | Bosselmann et al. | 702/159 |
| 8,026,623 B2* | 9/2011 | Wakasa | F03D 7/0224 290/44 |
| 8,058,753 B2* | 11/2011 | Achilles et al. | 307/153 |
| 2010/0023179 A1* | 1/2010 | Korba et al. | 700/297 |
| 2010/0109447 A1 | 5/2010 | Delmerico | |
| 2010/0111693 A1* | 5/2010 | Wilson | F03D 7/0224 416/1 |

FOREIGN PATENT DOCUMENTS

| | | |
|---|---|---|
| CN | 101449444 A | 6/2009 |
| EP | 2009760 A2 | 12/2008 |
| EP | 2182207 A2 | 5/2010 |
| WO | WO 2007139461 A1 | 12/2007 |

* cited by examiner

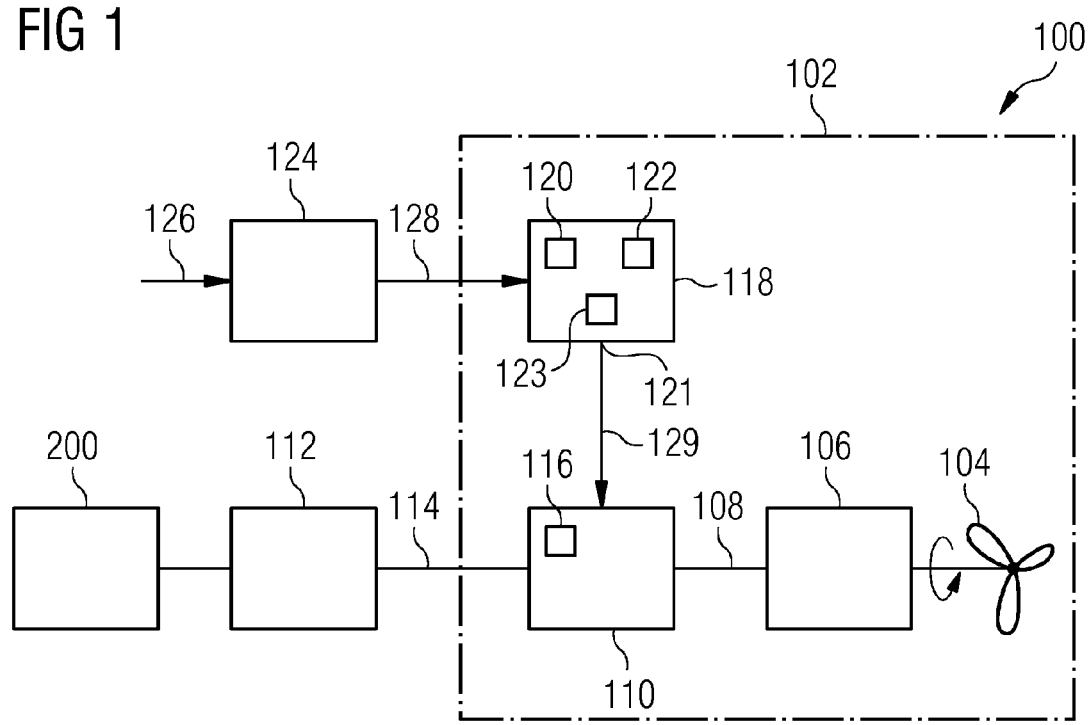

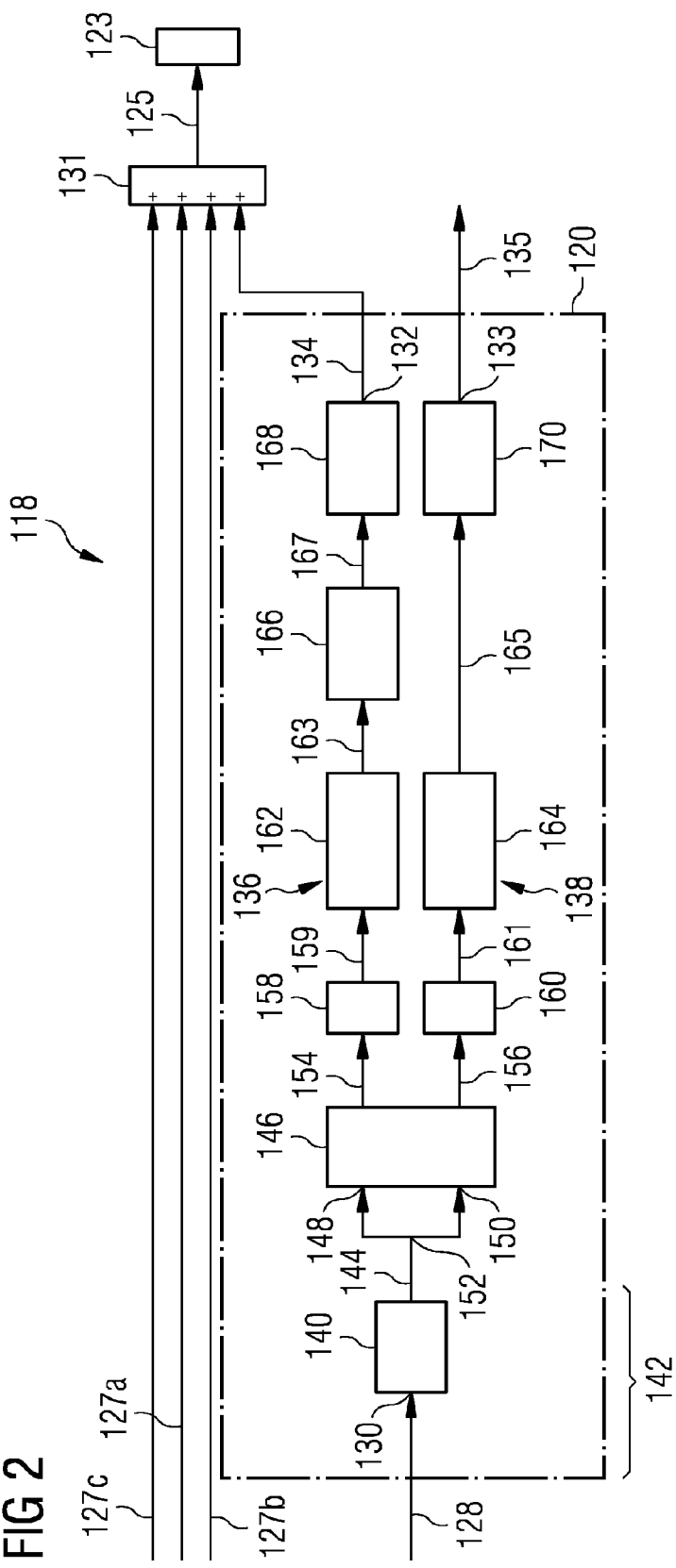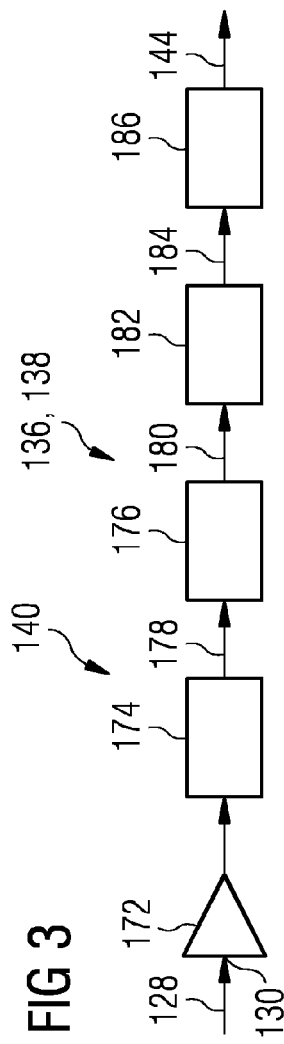

POWER OSCILLATION DAMPING CONTROLLER

CROSS REFERENCE TO RELATED APPLICATIONS

This application is the US National Stage of International Application No. PCT/EP2011/059704, filed Jun. 10, 2011 and claims the benefit thereof. The International Application claims the benefits of European application No. 10181108.1 EP filed Sep. 28, 2010. All of the applications are incorporated by reference herein in their entirety.

FIELD OF THE INVENTION

The present invention relates to the field of power generation devices and in particular to power generation devices which include a converter.

ART BACKGROUND

EP 2 009 760 A2 discloses a power system stabilizer comprising a sensor configured for sensing a signal representative of electromechanical oscillations of the power system; a controller configured for using the sensed signal for generating control signals for damping the electromechanical oscillations; and a damper comprising a damping converter and a resistor coupled to the damping converter, the damping converter being coupled to the power system through a power bus and being configured for using the control signals for damping the electromechanical oscillations. A modulation of the current through the resistor is done based on the feedback signal from the sensor.

In view of the above-described situation, there exists a need for an improved technique that enables to damp power oscillations efficiently in an electricity network.

SUMMARY OF THE INVENTION

This need may be met by the subject-matter according to the independent claims. Advantageous embodiments of the herein disclosed subject-matter are described by the dependent claims.

According to a first aspect of the herein disclosed subject-matter, a controller for a power generation device is provided, the controller comprising: an input for receiving an oscillation indicating signal indicative of a power oscillation in an electricity network; an output for providing an oscillation damping control signal in response to the oscillation indicating signal; a signal processing chain between the input and the output; the signal processing chain comprising a filter configured for passing only signals within a predetermined frequency range.

This aspect is based on the idea that by providing the filter which passes only signals within a predetermined frequency range the oscillation indicating signal does not need to be pre-configured for the controller according to embodiments of the herein disclosed subject-matter. In particular, according to an embodiment of the herein disclosed subject-matter, the controller does not require a specific sensor for sensing the oscillation indicating signal. Rather, any existing signal which is indicative of the power oscillation and the electricity network may be used as oscillation indicating signal, wherein the filter selects the predetermined frequency range. According to an embodiment, the predetermined frequency range is in a range in which power oscillations occur in the electricity network. In particular, according to an embodiment the predetermined frequency range includes the frequency of the power oscillation in the electricity network.

According to an embodiment, the filter comprises a high pass filter stage, e.g. a washout stage, to remove DC components and very low frequencies. The lower frequency limit of the high pass filter stage depends on the frequency of the oscillation of interest. A typical range for these oscillations is 0.1 Herz (Hz) to 1.5 Hz. Further, the filter may comprise a low pass stage with a cut of frequency that removes higher frequency components from the oscillation indicating signal. For example, in an embodiment the cut-off frequency is e.g. in a frequency range between 2 Hz and 10 Hz. According to an embodiment, the low pass stage is placed right after the high pass filter stage.

According to an embodiment, the oscillation damping control signal is configured for, when acting on the power generation device, damping power oscillations by which power is oscillated between different locations in the electricity network. Therefore, such power oscillations are also referred to as interarea oscillations.

Generally herein, "acting on the power generation device" includes providing the damping control to a power controller of the power generation device, which power controller is configured for controlling the power generation device depending on the damping control signal.

According to an embodiment, the signal processing chain further comprises a phase-shifting unit for providing a phase difference between the oscillation indicating signal and the oscillation damping signal. The phase difference causes a reduction of the power oscillation in the electricity network. In other words, the phase difference generated by the phase-shifting unit results in a phase difference between the oscillation indicating signal and the oscillation damping control signal and, hence, a phase difference between the power oscillations in the electricity network and the oscillation damping control signal. In this way, by acting on the power generation device with the oscillation damping control signal, the power generation device supplies power which is in an appropriate phase relation with the power oscillations in the electricity network. By this operation of the power generation device in an appropriate phase relation, the power oscillation in the electricity network is efficiently damped. The appropriate phase relation depends on both modulation signal and the location of the damping unit (according to an embodiment to be understood as the entire wind park, i.e. the whole wind park acts as a damping unit).

According to a further embodiment, the signal processing chain further comprises a phase adjustment unit configured for providing a phase difference between the oscillation indicating signal and the oscillation damping control signal, the phase difference provided by the phase adjustment unit being dependent on a geographical location of the power generation device, e.g being dependent on a geographical location of the power generation device as well as on a power modulation signal, i.e. active and/or reactive power. According to an embodiment, the phase adjustment unit is configured for taking into account and compensating for phase differences occurring due to the geographical location of the power generation device. For example, for wind power applications, the power generation devices correspond to individual wind turbine devices which may be distributed over a large area. For example, in a power generation park which includes a plurality of power generation devices, the phase-shifting unit mentioned above may provide for an overall phase difference which is necessary to damp the power oscillations in the electricity network. Further, according to an embodiment the phase adjustment unit, which may provide an individual phase difference for each power generation device, takes into account the phase difference that additionally occurs due to the different distance of the respective power generation devices from the point of common coupling, by which the power generation devices of the power generation park are coupled to the electricity network. In this way, the damping of the power oscillation in the electricity network may be further increased by respective fine-tuning of the phase difference.

According to a further embodiment, the signal processing chain further comprises a limiting unit configured for maintaining the oscillation damping control signal within predetermined limits. Such a limiting unit may be provided at different locations in the signal processing chain. For example, a limiting unit may be provided before any component of the signal processing chain that is sensitive to signals which exceed certain limits. However, a limiting unit may be provided as last active element in the signal processing chain in order to maintain the oscillation damping control signal within the predetermined limits irrespective of the operation of the previous components of the signal processing chain.

It should be understood, that the limiting unit may be provided in several implementations. For example, the limiting unit may be configured so as to cut off the oscillation damping control signal if the oscillation damping control signal exceeds the predetermined limits. In another embodiment, the limiting unit may act back on an amplifier in the signal processing chain so as to reduce the amplification factor (gain) provided by the amplifier, thereby reducing the amplitude of the oscillation damping control signal and thereby maintain the oscillation damping control signal within the predetermined limits.

According to a further embodiment, the signal processing chain further comprises a delay compensation circuit for compensating a delay with which the oscillation indicating signal is received. For example, the oscillation indicating signal may be a signal obtained from a sensor that is located close to the controller. However, in another embodiment, the oscillation indicating signal is a signal that is broadcasted from a power generation park controller to the individual controllers of the power generation devices of the power generation park. In this case, there may be a time delay between measuring a certain quantity in the electricity network, e.g. voltage or frequency, and the reception of a corresponding signal broadcasted by a power generation park controller. In such a case, the delay compensation unit may be configured for compensating such a delay. Hence, in this way the damping of the power oscillation in the electricity network may be further increased.

According to an embodiment, the signal processing chain further comprises a filter stage, e.g. a notch filter, for filtering out (i.e. removing) frequencies which excite oscillations in mechanical components of the wind turbine device. Such frequencies may be present due to mechanical resonances of components of the wind turbine device. Hence, in an embodiment the notch filter avoids interaction at mechanical resonance frequencies. Hence, this filter stage may serve to protect components of the wind turbine device which might otherwise be excited by the removed frequencies. For example, such a notch filter may be provided after at least one preceding element in the signal processing chain. In this way, mechanical resonance frequencies which might be generated by preceding components in the signal processing chain as well as frequencies that remain from the filter which passes only signals within a predetermined frequency range are removed. For example, according to an embodiment, the notch filter is placed in the signal processing chain as a penultimate element or as a last element. For example, if the notch filter is a penultimate element in the signal processing chain, the last element in the signal processing chain may be a limiting unit described above which maintains the oscillation damping control signal within predetermined limits.

According to a further embodiment, the signal processing chain described above is a first signal processing chain and the output is a first output of the controller. According to an embodiment, the oscillation damping control signal is a first oscillation damping control signal configured for controlling an active power provided by the power generation device. Further, in an embodiment, the controller comprises a second output and a second signal processing chain between the input and the second output, wherein the second signal processing chain is configured for providing a second oscillation damping control signal for controlling a reactive power provided by the power generation device. Hence, in accordance with embodiments of the herein disclosed subject-matter, active power as well as reactive power generated by the power generation device is controlled so as to damp the power oscillation in the electricity network. In accordance with an embodiment, the power generation device comprises a converter. A converter has the advantage that in an embodiment it allows to adjust the active power and the reactive power provided by it to be controlled independently.

According to an embodiment, the controller further comprises a weighting unit, the weighting unit being configured for setting, in response to a weighting signal, a magnitude of the first oscillation damping control signal and/or a magnitude of the second oscillation damping control signal. Hence, in an embodiment, the weighting unit may be configured for adjusting a magnitude of an active power component and a magnitude of a reactive power component used to damp the power oscillation in the electricity network. The purpose of both the active and the reactive part of the oscillation damping control signal is to interact with the synchronous generators in the power system to increase their oscillatory damping.

According to a second aspect of the herein disclosed subject-matter, a control system for controlling a power generation device is provided, the control system comprising a controller as set forth in the first aspect or an embodiment thereof; and a system output for providing a control system for the power generation device.

According to a further embodiment, the control system further comprises a further controller for providing a further control signal; and a summing unit for summing the damping control signal and the further control signal. For example, the further controller may be a drive train damping controller provided to damp oscillations due to the interaction between rotor and generator in the drive train of the power generation device. Further, a further controller may be an active tower damping controller of a power generation device in the form of a wind turbine, the active tower damping controller preventing tower movements during high wind speeds and gust. Further, a further controller may be a blade edge damping controller for a power generation device in the form of a wind turbine which prevents edges oscillation of the blade of the wind turbine due to wake effects in wind farms.

According to embodiments of the second aspect, the control system is adapted for providing the functionality of one or more of the aforementioned aspects and embodiments and/or for providing the functionality as required by one or more of the aforementioned aspects and embodiments.

According to a third aspect of the herein disclosed subject-matter, a power generation park is provided, the power generation park comprising: at least one power generation device; and at least one controller according to the first aspect or an embodiment thereof.

According to a fourth aspect of the herein disclosed subject-matter, a power generation park is provided, the power generation park comprising at least one power generation device; and at least one control system according to the second aspect or an embodiment thereof.

According to an embodiment of the third and the fourth aspect, the power generation park is adapted for providing the functionality of one or more of the aforementioned aspects and embodiments and/or for providing the functionality as required by one or more of the aforementioned aspects and embodiments.

According to a fifth aspect of the herein disclosed subject-matter, a method of operating a controller for a power generation device is provided, the method comprising: receiving an oscillation indicating signal indicative of a power oscillation in an electricity network; passing the oscillation indicating signal through a signal processing chain thereby providing an oscillation damping control signal in response to the oscillation indicating signal; wherein passing the oscillation indicating signal through a signal processing chain comprises passing only signals within a predetermined frequency range.

According to an embodiment of the fifth aspect, the method is adapted for providing the functionality of one or more of the aforementioned aspects and embodiments and/or for providing the functionality as required by one or more of the aforementioned aspects and embodiments.

According to a sixth aspect of the herein disclosed subject-matter, a method of operating a control system of a power generation device is provided, the method comprising: performing a method according to the fifth aspect or an embodiment thereof; providing a control signal for the power generation device, the control signal being dependent on the oscillation damping control signal.

According to an embodiment of the sixth aspect, the method is adapted for providing the functionality of one or more of the aforementioned aspects and embodiments and/or for providing the functionality as required by one or more of the aforementioned aspects and embodiments.

According to a seventh aspect of the herein disclosed subject-matter, a method of operating a power generation park including a power generation device is provided, the method comprising: performing a method according to the sixth aspect or an embodiment thereof; and providing the control signal to the power generation device.

According to an embodiment of the seventh aspect, the method is adapted for provided the functionality of one or more of the aforementioned aspects and embodiments and/or for providing the functionality as required by one or more of the aforementioned aspects and embodiments.

According to an eighth aspect of the herein disclosed subject-matter, a computer program is provided, the computer program being configured for controlling a physical object, namely a power generation device, the computer program being adapted for, when being executed by a data processor device, controlling the method as set forth in the fifth aspect or an embodiment thereof.

According to a ninth aspect of the herein disclosed subject-matter, a computer program is provided, the computer program being configured for controlling a physical object, namely a power generation device, the computer program being adapted for, when executed by a data processor device, controlling the method as set forth in the sixth aspect or an embodiment thereof.

According to a tenth aspect of the herein disclosed subject-matter, a computer program is provided, the computer program being configured for controlling a physical object, namely a power generation device, the computer program being adapted for, when executed by a data processor device, controlling the method as set forth in the seventh aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

Embodiments of the herein disclosed subject matter may be realized by means of a computer program respectively software. However, embodiments of the herein disclosed subject matter may also be realized by means of one or more specific electronic circuits respectively hardware. Furthermore, embodiments of the herein disclosed subject matter may also be realized in a hybrid form, i.e. in a combination of software modules and hardware modules.

In the above there have been described and in the following there will be described exemplary embodiments of the subject matter disclosed herein with reference to a controller of a power generation device, a control system, a power generation park, a method of operating a control system of a power generation device, a method of operating a control system of a power generation device, a method of operating a power generation park, and respective computer programs. It has to be pointed out that of course any combination of features relating to different aspects and embodiments of the herein disclosed subject matter is also possible. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWING

FIG. 1 shows in part a wind park in accordance with embodiments of the herein disclosed subject matter.

FIG. 2 shows a control system in accordance with embodiments of the herein disclosed subject matter.

FIG. 3 shows the filter and limiting unit of FIG. 2 in greater detail.

DETAILED DESCRIPTION

Figure 4:
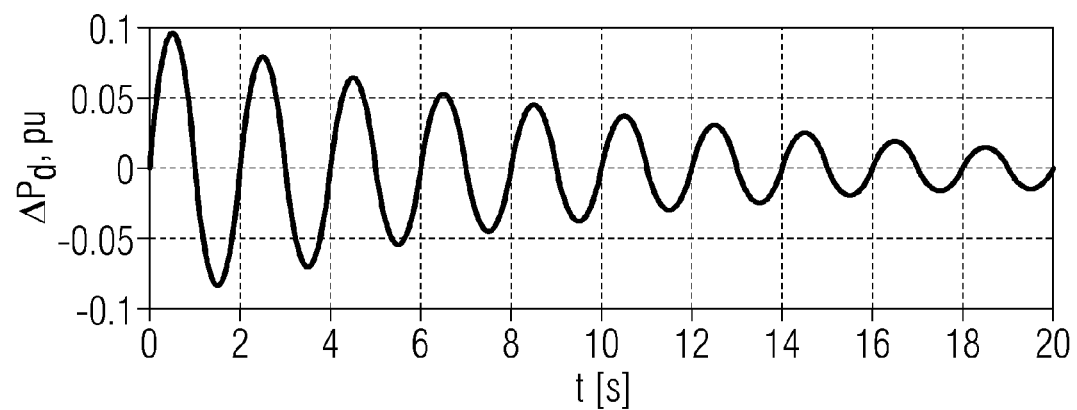
FIG. 4 shows the active power $\Delta P_d$ per unit (pu) over time t in seconds t(s) for a typical damping operation of a wind turbine device according to embodiments of the herein disclosed subject-matter.

The illustration in the drawing is schematically. It is noted that in different figures, similar or identical elements are provided with the same reference signs or with reference signs, which are different from the corresponding reference signs only within the first digit.

In the following, exemplary embodiments of the herein disclosed subject matter are discussed with regard to a power generation device in the form of a wind turbine and with regard to a power generation park in the form of a wind park. However, it should be understood that the teachings discussed herein and in particular the teachings discussed below are considered as being disclosed also for the general terms "power generation device" and "power generation park". In particular, embodiments of the herein disclosed subject matter which are related to wind turbine devices are as well applicable to power generation devices with a converter, wherein the converter is configured for receiving input power and providing, in response to the input power, an electrical output power.

Power oscillations typically occur in large interconnected power systems, where two or more areas are interconnected through relatively weak AC transmission lines, hence also referred to as inter-area oscillations. The frequency of the inter-area oscillation is typically in the range from 0.1 Herz (Hz) to 0.7 Herz. Whether or not an oscillation is stable or unstable is a system property. This means that it is not the contingency initiating the oscillation that determines the level of damping, instead it is the state of the power system, i.e. operating condition, controller tuning, transmission lines and generators in service, etc.

If a power oscillation between two areas of an electricity network is excited, the rotor angles of the synchronous machines in one area will start to oscillate in counter phase with the synchronous machines in the other area and thereby force a flow of active power back and forth between the areas. If the oscillation is sufficiently damped the oscillation will die out and the rotor angles return to a steady state. However, if there is insufficient damping in the power system for this particular oscillation an ever increasing amount of active power is exchanged between the two areas until other security devices, e.g. synchronous machine or transmission line safety equipment, trip the unit or component. A cascading effect of equipment tripping and ultimately system black out can be the consequence.

According to an embodiment, the power oscillation damping function is integrated into the wind turbine control system. Required input signals are generated either in a centralized way or in a distributed way in a wind farm.

Besides the power oscillation damping function (i.e. providing the power oscillation damping control signal), there may exist several further control signals in the wind turbine power control system which are used to dampen/prevent undesired oscillations generated from internal mechanical components. Such further control signals may include one or more of the following:

(a) Drive train damping control signal: Provided to damp oscillations which are due to the interaction between rotor and generator in the drive train of a wind turbine.

(b) Active tower damping control signal: Provided to prevent tower movements which are due to high wind speeds and gust.

(c) Blade edge damping control signal: Provided to prevent edge oscillation of the blade due to wake effects in wind farms.

In accordance with an embodiment of the herein disclosed subject matter, a controller for damping inter-area oscillations is provided.

FIG. 1 shows in part a wind park 100 in accordance with embodiments of the herein disclosed subject matter.

The wind park 100 comprises a plurality of wind turbine devices 102, one of which is exemplarily shown in FIG. 1. The wind turbine device 102 comprises a rotor 104 which drives a generator 106. In response to the rotational energy provided by the rotor 104, the generator 106 generates electrical energy 108. The electrical energy is then processed in a conditioning unit 110 which is electrically coupled to an electricity network 112 (e.g. a grid) in order to provide electrical output energy to the electricity network 112 in appropriate form. The electrical coupling between the conditioning unit 110 and the electricity network is indicated at 114 in FIG. 1. Further to the electricity network 112 there is electrically coupled a further wind park, generally indicated at 200 in FIG. 1.

Power oscillations are inherent to power systems based on synchronous generators. Depending on the configuration of the electricity network 112, the system will be more or less prone to inter area oscillations, which, once excited, will result in a transfer of active power back and forth between the synchronous generators in the power system. By proper control of the wind parks according to embodiments of the herein disclosed subject matter, the damping of the synchronous generators in the system is increased. It should be understood that the wind parks 100, 200 and the power stations based on synchronous generators are only exemplary and that usually more than two power generation parks or power generation stations are coupled to the electricity network. Consequently different inter-area oscillations may occur between these energy generating entities which may be however handled similar to the example described herein.

The conditioning unit 110 includes a converter 116 allowing to independently adjust the active power and the reactive power provided to the electricity network 112. The converter 116 is controlled by a control system 118. The control system 118 comprises a controller 120, i.e. an power oscillation damping controller (also referred to as POD controller in the following), which is configured in accordance with embodiments of the herein disclosed subject matter. Further, the control system 118 includes at least one further controller 122, one of which is shown in FIG. 1.

The control system 118 of the wind turbine device 100 is controllably coupled to a park controller 124 which controls the control systems 118 of the individual wind turbine devices 102 in the wind park 100. In accordance with an embodiment, the park controller 124 receives as an input signal 126 indicative of operating parameters such as a voltage or a frequency of the power provided to the electricity network 112. In response to the input signal 126, the park controller 124 provides an oscillation indicating signal 128 to the control system 118. In an embodiment, the oscillation indicating signal 128 is identical to the input signal 126. In other embodiments, the oscillation indicating signal 128 is a local signal generated within or in the proximity of the wind turbine device 102. The POD control can be located both at the wind park controller as well as within the individual wind turbine devices 102, or even elsewhere. When located at park level, the set point changes are communicated to the individual wind turbine devices. By taking into account the oscillation indicating signal, the control system 118 provides at its system output 121 one or more control signals, generally indicated at 129 in FIG. 1, to the conditioning unit 110 to thereby control the conditioning unit 110 and in particular the converter 116. According to an embodiment, the POD controller 120 provides a power oscillation damping signal to a wind turbine power controller 123, herein also referred to as "power controller" which in response hereto adjust the set points for the converter 116 accordingly, e.g. by means of the control signal 129. In a further embodiment, the power oscillation damping signal is combined with a control signal from the at least one further controller 122, thereby providing a combined control signal to the turbine power controller 123.

It should be noted that the oscillation indicating signal 128 is not necessarily a specifically tailored signal. Rather any signal that includes information about the power oscillation (inter-area oscillation) may be used as oscillation indicating signal 128.

According to an embodiment, the POD controller 120 is capable of taking input, i.e. taking an oscillation indicating signal, from grid modules located either at a Point of Common Connection (PCC), externally in the grid, or delivered from a remote location with a high-speed communication link. The POD controller 120 is fed with input signal(s) required to dampen the oscillations in the grid. When using measurements local to the wind park, the input signal(s) can be obtained at the Wind Power Plant (WPP) (typically a park pilot module). In an embodiment, the input signals, i.e. the oscillation indicating signals, include at least one of the following: bus frequency, current, power, generator speed, etc. The at least one oscillation indicating signal is first passed through at least one conditioning filter, the design of which depends on the at least one oscillation indicating signal. These filters remove measurement noise, extract the oscillation that is to be damped by the POD controller from the input signal, and compensate for time delay e.g. when external monitoring signals are used as oscillation indicating signals.

According to an embodiment, the POD controller 120 will damp grid oscillations using both active and reactive power modulations, e.g. by using first and second oscillation damping control signals. This is possible with variable speed wind turbine devices (e.g. Double Feed Induction Generator (DFIG), full-load converter concepts, etc.) due to the independent control of active and reactive power.

FIG. 2 shows a control system 118 in accordance with embodiments of the herein disclosed subject matter. In particular, FIG. 2 shows the oscillation damping controller 120 of the control system 118 in greater detail.

In accordance with an embodiment, the controller 120 comprises an input 130 for receiving the oscillation indicating signal 128 indicative of a power oscillation in an electricity network. Further, the controller 120 comprises a first output 132 and a second output 133 for providing a first oscillation damping control signal 134 and a second oscillation damping control signal 135 in response to the oscillation indicating signal 128. In accordance with an embodiment, a first signal processing chain 136 is provided between the input 130 and the first output 132 and a second signal processing chain 138 is provided between the input 130 and the second output 133.

According to an embodiment, the first oscillation damping control signal 134 is configured for controlling an active power provided by the wind turbine device. Further in accordance with an embodiment, the second oscillation damping control signal 135 is configured for controlling a reactive power provided by the wind turbine device.

According to an embodiment, the first oscillation damping signal 134, being configured for controlling the active power provided by the wind turbine device, is provided to a summing unit 131 which combines the first damping control signal 134 and at least one further control signal, e.g. three further control signals 127a, 127b, 127c. According to an embodiment, a first further control signal 127a is drive train damping control signal, a second further control signal 127b is an active tower damping control signal and a third further control signal 127c is a blade edge damping control signal. As an output, the summing unit 131 provides a combined signal 125 which is fed to the power controller 123 of the wind turbine device.

According to an embodiment, the first signal processing chain 136 and the second signal processing chain 138 have a common chain portion 142.

In accordance with an embodiment, the signal processing chain comprises a filter and limiting unit 140. According to an embodiment, the filter and limiting unit 140 is a chain portion of the first signal processing chain 136 and also a chain portion of the second signal processing chain 138. Hence, the filter and limiting unit 140 is part of a common chain portion 142 of the first and second signal processing chain 136, 138.

The output signal 144 of the filter and limiting unit 140 is supplied to a the weighting unit 146 which is configured for setting, in response to a weighting signal, a magnitude of the first oscillation damping control signal 134 and/or a magnitude of the second oscillation damping control signal 135, thereby adjusting a ratio between the magnitude of first oscillation damping control signal 134 and the magnitude of the second oscillation damping control signal 135.

In an embodiment, the weighting signal is the output signal 144 of the filter and limiting unit 140. For example, in an embodiment, the weighting signal is a reactive power portion of the output signal 144. In another embodiment, the weighting signal is an active power portion of the output signal 144. However, other weighting signals are also possible.

In an embodiment, both output signal portions of the output signal 144, i.e. the reactive power portion and the active power portion are fed to each of the first signal processing chain 136 and the second signal processing chain 138. For example, the output signal 144 is fed to a first input 148 of the weighting 146 and to a second input 150 of the weighting unit 146 by means of a branching point 152, as shown in FIG. 1.

According to an embodiment, the branching point 152 marks the separation of the first signal processing chain 136 and the second signal processing chain 138.

According to an embodiment, the oscillation damping control signals 134, 135 are indicating changes in a quantity which controls the active and reactive power output of the wind turbine devices, e.g. active and reactive currents, voltage (e.g. for reactive power), active power P and/or reactive power Q. For example, in an embodiment the changes in set points of the active power P and the reactive power Q due to the damping action, delta-P 134 and delta-Q 135, is transmitted to the control of the individual wind turbines, which regulates the active and reactive power output accordingly. The damping torque from the reactive power modulation, delta-Q, is handled directly from the network side converter. The delta-Q regulation is subject to the reactive power capabilities of the wind turbine in its current operating point.

From the weighting unit 146 there is provided a weighted response signal 154 for the active power P and a weighted response signal 156 for the reactive power Q.

According to an embodiment, the signal in the first and second signal processing chain 136, 138 is furthermore compensated for time delays in the communication from the park pilot module. For example, in an embodiment, the weighted response signals 154, 156 from the weighting unit are fed to a corresponding delay compensation unit 158, 160, resulting in delay compensated response signals 159, 161.

According to an embodiment, in each signal processing chain 136, 138 a phase adjustment unit 162, 164, e.g. a local lead/lag stage, is provided for each wind turbine device. In an embodiment, the phase adjustment unit 162, 164 is configured to compensate the phase angle according to the geographical location of the wind turbine device within the park. For example, in an embodiment, the phase adjustment units 162, 164 receive the delay compensated response signal 159, 161, respectively. The phase adjustment units 162, 164 provide phase adjusted response signals 163, 165.

According to a further embodiment, the signal processing chain, e.g. the first signal processing chain 136, comprises a notch filter 166 for filtering out frequencies which correspond to mechanical oscillations and/or resonance frequencies of the wind turbine device or a part thereof. For example in an embodiment, in order to prevent instability and avoid mechanical resonance the signal in the first signal processing chain, e.g. the phase adjusted response signal 163 is filtered through the notch filter (band stop) which removes one or more of the following: higher harmonic frequencies 1p, 3p; a drive train mode; a tower mode; an edge and flap mode; etc. As a result, the notch filter 166 provides a notch filtered signal 167.

Before the processed oscillation indication signal from the signal processing chain is provided to the control of the wind turbine device, the respective processed oscillation indication signal (notch filtered signal 167 in case of the first signal processing chain and phase adjusted response signal 165 in case of the second signal processing chain) is fed through a limiting unit 168, 170, e.g. through a saturation and rate limiter block, to make sure that processing oscillation indicating signal is within predetermined limits.

For example, according to an embodiment, the delta-P signal 134 is maintained within its design limits by limiting unit 168. For example, in an embodiment, the delta-P signal is conditioned according to constraints of the wind turbine device, e.g. through saturations and rate limiters, and these are designed to avoid that delta-P signal follows the output limitations. One approach to avoid output clipping is to complement the saturations with a dynamic gain reduction control.

The conditioned delta-P signal 134 is added to the power reference in the power controller where it will be sent to the grid side converter (e.g. inverter) 116 to generate the necessary torque current Iq.

The delta-Q signal will be filtered in the same way as the delta-P input signal (FIG. 3) but will not filtered by any notch filters due to the lack of mechanical influence. The control of the delta-Q signal is handled by the converter 116.

In general, a wind turbine generates the max amount of active power in correspondence to the available wind and is not operated such that additional active power can be extracted. With the POD controller 120 according to embodiments of the herein disclosed subject matter, it is possible to extract or consume energy by changing the rotational speed of the mechanical system. This means that when the POD controller 120 sends positive delta-P signals to the wind turbine power controller, additional active power is drawn from the generator leading to a temporary decrease in rotational speed. When the power controller receives a negative delta-P signal from the POD controller, the rotational speed of the drive train will increase accordingly. This requires that the rotational speed reference of the mechanical system can be changed by the control in order to extract or deposit energy from the control action.

FIG. 3 shows the filter and limiting unit 140 of FIG. 2 in greater detail.

As shown in FIG. 3, the oscillation indicating signal 128 is fed to an amplifier 172 for amplification of the oscillation indicating signal 128. According to an embodiment, the amplifier is the first component in the signal processing chain 136, 138 and may hence provide the input 130 of the POD controller 120.

According to an embodiment, the signal processing chain 136, 138 comprising a filter configured for passing only signals within a predetermined frequency range. In an embodiment shown in FIG. 3, this filter is implemented by a washout stage 174 (high pass filter stage) to remove DC and very low frequencies and a low pass stage 176, e.g with a cut-off frequency around 3-5 Herz. According to an embodiment, the low pass stage 176 is placed right after the washout stage 174, receiving the partially filtered signal 178 from the washout stage 174. The filter 174, 176 is introduced to make sure that only the relevant modes, i.e. the signals 180 within the predetermined frequency range are passed through the POD controller 120 while higher frequencies are attenuated. The signal processing chain 136, 138 further comprises lead/lag stage 182 which compensates the phase of the signal, thereby ensuring damping of the power oscillations in the electricity network. The lead/lag stage output 184 is conditioned according to constraints of the WT, e.g. through at least one saturation limiter and/or at least one rate limiters, generally indicated at 186 in FIG. 3. These limiters 186 are designed to avoid that the output 144 of the limiting unit 140 follows the output limitations. One approach to avoid output clipping is to complement the saturations with a dynamic gain reduction control. However, other approaches can also be applied.

According to an embodiment, part of the signal processing chain 136, 138 is located in different locations in the wind park 100. For example, in an embodiment part of the signal processing chain 136, 138 is located in a central controller, e.g. in the park controller 124 shown in FIG. 1. Other parts (or components) of the signal processing chain 136, 138 may be located in the power generation device (wind turbine device in the embodiments shown in the drawings). For example, the phase adjustment units 162, 164 or the notch filter 166 (see FIG. 2) may be located in the wind turbine device. For example, in an embodiment, the common chain portion 140 of the signal processing chains 136, 138 is located in a central controller. In another embodiment, when viewed in signal propagating direction, the signal processing chain up to the phase adjustment units 162, 164 (i.e. units 140, 146, 158, 160 in FIG. 2) are located in the central controller.

In another embodiment (shown e.g. in FIG. 1), the entire signal processing chains 136, 138 are located in the wind turbine device.

Hence, the above embodiments include in particular the following measures:

1) The communication and interaction between input signals (measurements) and the POD controller. This can be outlined either in the grid or locally on the turbines.

2) A way of processing the POD signal in the wind turbine device controller while ensuring stability and limiting mechanical stresses on the wind turbine device components.

3) Damp inter-area oscillations in the electrical grid by letting the wind turbines inject oscillating power on top of actual production, even when actual production is nominal power.

Delivery of damping torque from active power modulation is only associated with delivery of active power when the power system is perturbed from its steady state; in steady state no additional active power is delivered due to the damping controller. Clearly, a simple way to achieve this is to operate the wind park at curtailed power production and thereby have a predetermined amount of active power available for the controller. Compared to fossil power stations an advantage of wind power is that the fuel is free and, naturally, it is desirable to deliver the maximum available power in order to use the natural resources at its best. Hence the goal is to minimize any lost production caused by curtailed operation due to the delivery of damping torque. The oscillatory nature of the response furthermore means that the net energy in the modulated active power will be low, or even negative. Therefore, the proposed controller utilizes the rotational energy stored in the mechanical system as storage from where the damping power can be exchanged. When positive active power is required energy is drawn from the rotational system, while the rotational speed of the mechanical system is increased in the half cycle where negative damping power is injected, as shown in FIGS. 4 and 5.

FIG. 4 shows the active power $\Delta P_d$ per unit (pu) for a typical damping operation of a wind turbine device according to embodiments of the herein disclosed subject-matter. As can be seen, the damping oscillation of the active power has an amplitude of about 0.1 per unit, i.e. about 10% of the rated active power of the wind turbine device. As can be further seen in FIG. 4, the amplitude decreases with time meaning that the power oscillation in the electricity network decreases and hence also the modulation of the electrical output power for damping the power oscillation decreases in amplitude.

Figure 5:
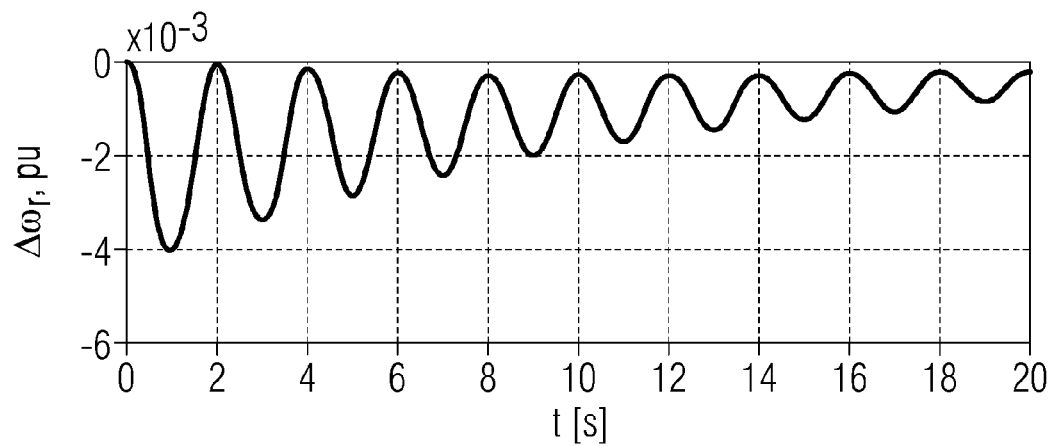
FIG. 5 shows the rotational speed $\Delta \omega_r$ over time t in seconds (s) of the rotor of the wind turbine device per unit (pu)$\times 10^{-3}$.

FIG. 5 shows the rotational speed $\Delta \omega_r$ of the rotor 104 of the wind turbine device 102 (see FIG. 1) per unit (pu)$\times 10^{-3}$. As can be seen, in accordance with an embodiment the rotational speed is at the rated speed and the deviation is 0. Upon initiating a modulation of the electrical output power, the rotational speed of the rotor 104 (see FIG. 1) of the wind turbine device is decreased in order to allow the additional power between the two rotational states to be fed to the converter 116 (see FIG. 1) and thus to be output in order to provide the active power modulation shown in FIG. 4. In accordance with the decreasing amplitude of the active power modulation $\Delta P_d$ in FIG. 4, also the amplitude of the rotational speed differences decreases with time as shown in FIG. 5. Further, the difference in rotational speed between the actual rotational speed and the rated rotational speed tends to vanish with time to the same extent as the power oscillation in the electricity network vanishes. In an embodiment, the actual rotational speed is controlled by the wind turbine control. The speed deviation in FIG. 5 will reduce up to a steady state value, which represents the net amount of energy extract from the rotor. And this steady state deviation from nominal speed is removed with control.

The advantage of the this control is that the wind park can be set to deliver maximum power output, while still being capable of contributing with damping power.

In another implementation the POD controller is placed at the individual wind turbine devices and the modulations to the reference signals are here computed locally. With this setup the input to the POD controller can be either local to the wind turbine devices, transmitted from park level, or delivered from external sources via high-speed communication. The functionality of the POD is the same as when it is placed centrally in the wind park. Another feature is to combine POD control with turbine load control (e.g. TLC3). With turbine load control, the load on the wind turbine is either increased or decreased with respect to its lifetime. According to the lifetime consumption rate, the wind turbine is controlled to achieve the designed lifetime.

According to an embodiment, the POD controller is configured for receiving a load control signal and adjust limits for the amplitude of the oscillation damping control signal depending on the load control signal. For example, larger amplitudes may be allowed if there is lifetime for it. In an embodiment, the load control signal is taken into account by limiters in the signal processing chain, e.g. by the limiters 168, 170 in FIG. 2 and/or the limiter 186 in FIG. 3.

According to embodiments of the invention, any suitable component of the wind turbine device or the wind park, e.g. the POD controller 120 or the power controller 123 are provided in the form of a processor device having respective computer program products running thereon which enable the processor device to provide the functionality of the respective elements as disclosed herein. It should be understood that depending on the actual implementation further elements, e.g. analogue-digital converters and/or digital-analogue converters, may be added to the signal processing chain. According to other embodiments, any controlling or signal processing component of the wind turbine device or the wind park, e.g. the POD controller 120 or the power controller 123 may be provided in hardware. According to other—mixed—embodiments, some components may be provided in software while other components are provided in hardware. Further, it should be noted that a separate component (e.g. component, module, processor device) may be provided for each of the functions disclosed herein. According to other embodiments, at least one component (e.g. a component, module, processor device) is configured for providing two or more functions as disclosed herein.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

In order to recapitulate some of the above described embodiments of the present invention one can state:

There is provided a power oscillation damping (POD) controller (120) for a power generation device such as a wind turbine device. The POD controller (120) receives an oscillation indicating signal (128) indicative of a power oscillation in an electricity network and provides an oscillation damping control signal (134, 135) in response to the oscillation indicating signal (128), by processing the oscillation damping control signal (128) in a signal processing chain (136, 138). The signal processing (136, 138) chain comprises a filter (140) configured for passing only signals within a predetermined frequency range.

The invention claimed is:

1. A controller for a power generation device of a power generation park, the power generation park having a common point of coupling by which the power generation devices of the power generation park are coupled to an electricity network, the controller comprising:
   an input for receiving an oscillation indicating signal indicative of a power oscillation in the electricity network;
   a first output for providing a first oscillation damping control signal in response to the oscillation indicating signal, wherein the first oscillation damping control signal is for controlling an active power, wherein the first oscillation damping control signal is transmitted to a summing unit, wherein the summing unit sums the first oscillation damping control signal and at least one other control signal;
   a second output for providing a second oscillation damping control signal for controlling a reactive power provided by the power generation device;
   a signal processing chain between the input and the first output, the signal processing chain comprising a filter configured for passing only signals within a predetermined frequency range;
   the signal processing chain further comprising;
      a phase adjustment unit configured for providing a phase difference between the oscillation indicating signal and the first oscillation damping control signal, the phase difference provided by the phase adjustment unit being dependent on a distance of the power generation device from the point of common coupling; and
   wherein the power generation device is a wind turbine device, the signal processing chain further comprising a notch filter for filtering out frequencies which excite mechanical resonance frequencies in the wind turbine device.

2. The controller as set forth in claim 1, wherein the signal processing chain further comprises:
   a phase shifting unit for providing a phase difference between the oscillation indicating signal and the first oscillation damping control signal.

3. The controller as set forth in claim 1, wherein signal processing chain further comprises:
   a limiting unit configured for maintaining the first oscillation damping control signal within predetermined limits.

4. The controller as set forth in claim 1, wherein the signal processing chain further comprises:
   a delay compensation unit for compensating a delay with which the oscillation indicating signal is received.

5. The controller as set forth in claim 1, further comprising;
   the first oscillation damping control signal being a first oscillation damping control signal configured for controlling an active power provided by the power generation device; and
   a second signal processing chain between the input and the second output, wherein the second signal processing chain provides the second oscillation control signal.

6. The controller as set forth in claim 5, further comprising:
   a weighting unit;
   the weighting unit being configured for setting, in response to a weighting signal, a magnitude of the first oscillation damping control signal and/or a magnitude of the second oscillation damping control signal.

7. A control system for controlling a power generation device, the control system comprising:
   a controller as set forth in claim 1; and
   a system output for providing a control signal for the power generation device.

8. A method of operating a controller for a power generation device of a power generation park, the power generation park having a point of common coupling by which the power generation devices of the power generation park are coupled to an electricity network, the method comprising:
   receiving an oscillation indicating signal indicative of a power oscillation in the electricity network;
   passing said oscillation indicating signal through a signal processing chain thereby providing a first oscillation damping control signal in response to the oscillation indicating signal, wherein the first oscillation damping control signal is for controlling an active power,
   wherein the first oscillation damping control signal is transmitted to a summing unit, wherein the summing unit sums the first oscillation damping control signal and at least one other control signal;
   wherein passing said oscillation indicating signal through a signal processing chain comprises passing only signals within a predetermined frequency range;
   providing a second oscillation damping control signal for controlling a reactive power provided by the power generation device;
   providing a phase difference between the oscillation indicating signal and the first oscillation damping control signal, the phase difference being dependent on a distance of the power generation device from the point of common coupling; and
   filtering out frequencies which excite mechanical resonance frequencies in the power generation device, wherein the filtering is performed by a notch filter, wherein the power generation device is a wind turbine device.

* * * * *